US012638003B2

(12) United States Patent
Cammarasana, II

(10) Patent No.: US 12,638,003 B2
(45) Date of Patent: May 26, 2026

(54) VERTICAL WIND TURBINE WITH EXTERNAL SHROUD COMPRISING FIRST AND SECOND SHROUD WINGS

(71) Applicant: Joseph A. Cammarasana, II, Yardley, PA (US)

(72) Inventor: Joseph A. Cammarasana, II, Yardley, PA (US)

( * ) Notice: Subject to any disclaimer, the term of this patent is extended or adjusted under 35 U.S.C. 154(b) by 416 days.

(21) Appl. No.: 17/574,172

(22) Filed: Jan. 12, 2022

(65) Prior Publication Data

US 2022/0381220 A1 Dec. 1, 2022

Related U.S. Application Data

(60) Provisional application No. 63/136,988, filed on Jan. 13, 2021.

(51) Int. Cl.
| | |
|---|---|
| *F03D 3/04* | (2006.01) |
| *F03D 3/00* | (2006.01) |
| *F03D 9/25* | (2016.01) |
| *F03D 80/00* | (2016.01) |
| *H02K 7/18* | (2006.01) |

(52) U.S. Cl.
CPC .............. *F03D 3/005* (2013.01); *F03D 9/25* (2016.05); *F03D 80/00* (2016.05); *H02K 7/183* (2013.01); *F05B 2220/706* (2013.01)

(58) Field of Classification Search
None
See application file for complete search history.

(56) References Cited

U.S. PATENT DOCUMENTS

| | | | | |
|---|---|---|---|---|
| 4,718,822 A | * | 1/1988 | Riezinstein | F03D 7/06 |
| | | | | 416/139 |
| 10,167,846 B2 | | 1/2019 | Azmudeh | |
| 10,612,515 B2 | | 4/2020 | Reyna et al. | |
| 10,871,143 B2 | | 12/2020 | Bahnmuller et al. | |
| 11,053,913 B2 | | 7/2021 | Grigg | |
| 11,060,502 B2 | | 7/2021 | Wang | |
| 2004/0042899 A1 | * | 3/2004 | Khan | F03D 7/06 |
| | | | | 416/197 A |
| 2004/0265116 A1 | * | 12/2004 | Kaneda | F03D 3/065 |
| | | | | 415/4.2 |
| 2005/0042095 A1 | * | 2/2005 | Kaliski | F03D 7/06 |
| | | | | 416/88 |
| 2007/0264116 A1 | * | 11/2007 | Dempster | F03D 9/257 |
| | | | | 415/4.2 |
| 2009/0284018 A1 | * | 11/2009 | Ellis | F03D 3/005 |
| | | | | 290/55 |
| 2012/0292912 A1 | * | 11/2012 | Haskell | H02K 7/183 |
| | | | | 290/55 |
| 2014/0147273 A1 | * | 5/2014 | Trenberth | F03D 7/06 |
| | | | | 416/62 |
| 2014/0284925 A1 | * | 9/2014 | Ross | F03B 15/00 |
| | | | | 290/52 |

* cited by examiner

*Primary Examiner* — Tulsidas C Patel
*Assistant Examiner* — S. Mikailoff
(74) *Attorney, Agent, or Firm* — PAUL & PAUL

(57) ABSTRACT

A vertical wind turbine includes a shroud for directing vehicle-created wind towards the turbine blades, which are oriented in response to wind direction.

11 Claims, 7 Drawing Sheets

VERTICAL WIND TURBINE WITH EXTERNAL SHROUD COMPRISING FIRST AND SECOND SHROUD WINGS

CROSS-REFERENCE TO RELATED APPLICATION

This application claims the priority of U.S. Provisional Patent Application 63/136,988, filed Jan. 13, 2021, which is incorporated by reference in its entirety.

BACKGROUND OF THE INVENTION

1. Field of the Invention

The present invention relates to devices and processes for capturing energy from renewable sources.

2. Brief Description of the Prior Art

Among the most widely adopted types of renewable energy devices are wind turbines. Typically, such devices are constructed on a large scale and positioned where reliable wind can be experienced. Such installations usually include a large horizontally mounted turbine rotating a large electrical generator far above the ground. Although a substantial amount of electrical power is being generated by such wind turbine installations, they have a number of significant drawbacks. They can be expensive to construct and difficult to maintain, as they must be sited where natural wind currents can be found. Some technically desirable locations may be unavailable, due to local opposition for aesthetic reasons. Sometimes, otherwise desirable locations may be difficult to access, requiring substantial additional expenditure for infrastructure to provide access for servicing. The electrical energy developed by such installations often must be funneled through transmission lines over long distances to the consumer.

Vertical wind turbines are known. Typically, such vertical wind turbines include a plurality of blades extending vertically arranged to rotate a central axis connected to an electrical energy generating device such as an alternator. Such vertical wind turbines have been adopted to provide small amounts of electrical power for mainly domestic use. Examples of such vertical wind turbines include those disclosed in U.S. Pat. Nos. 11,060,502, 11,053,913, 10,871, 143, 10,612,515, 10,167,846, all incorporated herein by reference.

Vertical wind turbines lend themselves for applications in which the wind direction is variable. Unlike horizontal wind turbines, which optimally must be aligned with the prevailing wind direction for optimum effect, vertical wind turbines can make use of wind coming from any direction on the compass.

Human activities create substantial disruption of natural air flow. A case in point is the air flow generated by moving vehicles such as automobiles, buses, and trucks, railcars, planes, etc.

As a vehicle moves, air is displaced around the vehicle. In every case air must be displaced and "wind" is produced. This vehicular wind represents energy consumed by vehicle operation. In the interest of energy conservation, it would be desirable to use such vehicular wind as an energy source. While the source and direction of the vehicular wind varies as the vehicle travels, and the intensity of the vehicular wind varies as the vehicle's speed changes, the placement of this device will optimize its effect.

There are some situations, however, in which the direction and intensity of vehicular wind approaches a constant. The best examples of these are high speed limited access motorways, on which vehicles travel at high speeds in a uniform direction, creating predictable amounts of vehicular wind. The present invention provides a means of recapturing energy otherwise being consumed and lost by the vehicles traveling on these motorways.

A 2013 study published in The Wildlife Society Bulletin found that wind turbines killed an estimated 573,000 birds annually in the United States. According to U.S. Wind Energy State Facts (October 2016), over 52,000 wind turbines were installed across 40 U.S. States plus Puerto Rico & Guam.

Thus, there is a pressing need for a more environmentally friendly energy generation device.

SUMMARY OF THE INVENTION

The present invention provides a vertical wind turbine which includes a rotatable central axle having a central axis, at least one pair of opposing fan blades mounted for rotation with the central axle, an electromagnetic electrical energy generation device connectable in series and mounted for rotation with the rotatable central axle, and an external shroud for directing wind toward the vertical fan blades. Preferably, the fan blades are positioned generally parallel to the central axle. Preferably, the vertical wind turbine further comprises a balancing mechanism mounted for rotation with the rotatable central axle. Preferably, each of the opposing fan blades is mounted for rotation about a respective axis parallel to the central axis, and the balancing mechanism includes means for altering the orientation of the fan blade in a plane normal to the central axis responsive to the force on the fan blade. Preferably, the vertical wind turbine further includes a protective cage surrounding the fan blades. Preferably, the external shroud is bilaterally symmetric. Preferably, the balancing mechanism is adapted to oppose rotational forces applied normal to the axis of the central axle. In one presently preferred embodiment, it is preferred that the shroud is adapted to receive wind incident in opposing directions on opposite sides of the shroud, producing positive spin with or without traffic.

The present invention also provides for a plurality of such vertical wind turbines positioned along a line. In a presently preferred embodiment, the line extends along the median of a highway, or along bridges, tunnels, runways, etc.

The present invention also provides a process for energy generation. The process includes the steps of:
- a) providing at least one vertical wind turbine, the at least one vertical wind turbine comprising:
  - a rotatable central axle having a central axis,
  - at least one pair of opposing fan blades mounted for rotation with the central axle,
  - an electromagnetic electrical energy generation device mounted for rotation with the rotatable central axle and connectable in series,
  - an external shroud for directing wind toward the vertical fan blades;
- b) positioning at least one vertical wind turbine along the median of a highway or along bridges, tunnels, runway, etc.; and
- c) collecting electrical energy from the energy generation device of the vertical wind turbine.

DETAILED DESCRIPTION

The present invention provides an environmentally friendly solution to electrical energy generation. Birds are protected from the fan blades by an external shroud such that no moving part of the turbine extends outside of the shroud.

The features, advantages and operation of the present invention will become readily apparent and further understood from a reading of this detailed description with the accompanying drawings, in which like numerals refer to like elements.

Figures 1, 2:
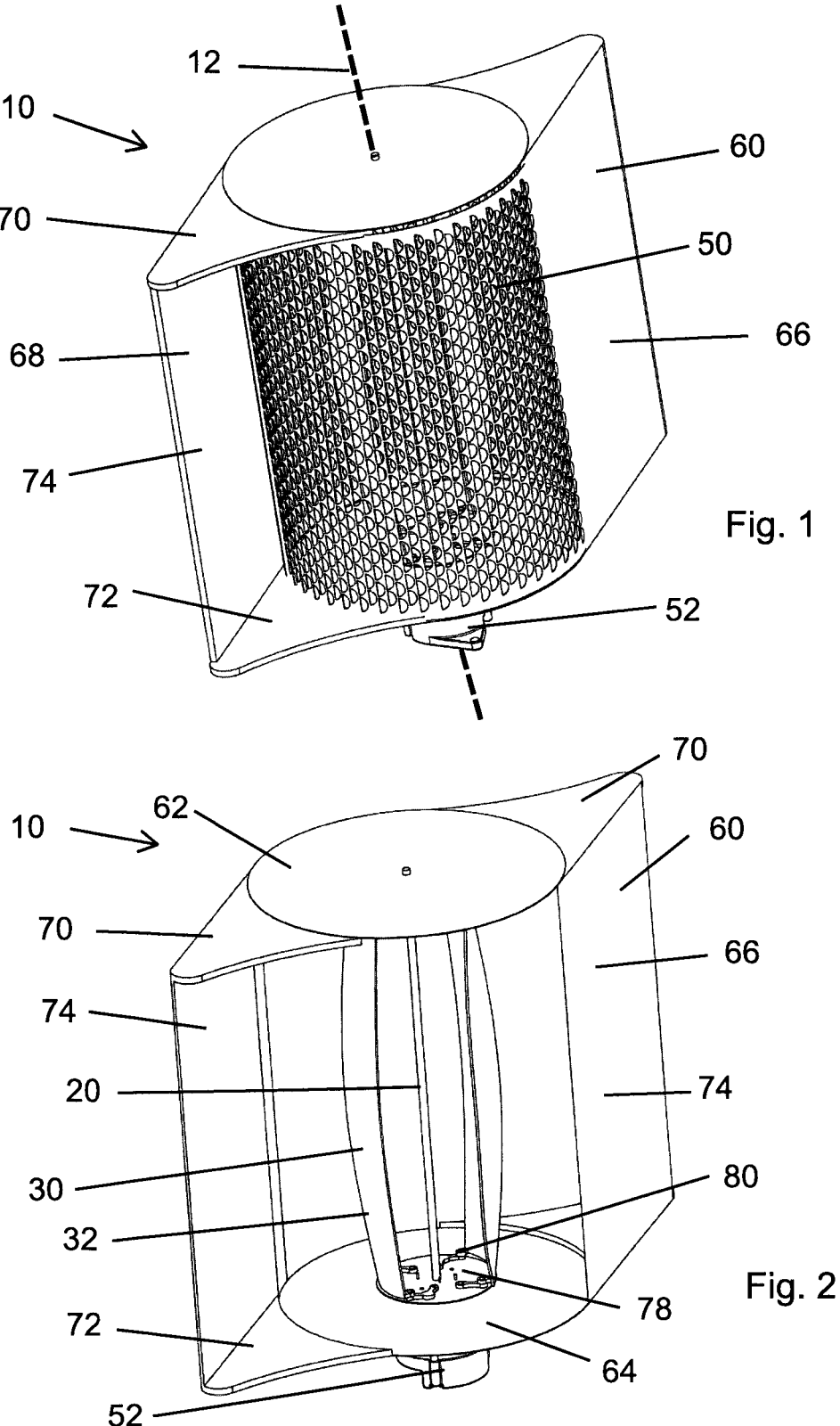
FIG. 1 is a perspective view of a vertical wind turbine according to the present invention.
FIG. 2 is a perspective view of the vertical wind turbine of FIG. 1 with the protective cage removed to show the fan blades, central axle, and related parts.

A perspective view of an embodiment of the vertical wind turbine 10 of the present invention is shown in FIG. 1. The vertical wind turbine 10 is disposed around a vertical central axis 12 and includes an external shroud 60 for directing wind into the vertical wind turbine 10. In the illustrated embodiment the external shroud 60 is shaped to receive wind blowing in opposite directions on either side of the vertical wind turbine 10, such as would be generated by vehicles traveling in opposing directions when the vertical wind turbine 10 is installed in the median strip of a lane-divided motorway. The external shroud 60 includes a general flat, generally circular upper shroud wall 62 and a generally flat, generally circular lower shroud wall 64 concentric with the upper shroud wall 62. Extending in opposed directions from the upper and lower shroud wall 62, 64 are first and second shroud wings 66, 68 for funneling wind received in either of the opposing directions toward the central axis 12. Each of the first and second shroud wings 66, 68 include a generally flat upper wing wall 70 extending from the upper shroud wall 62 and a generally flat lower wing wall 72 extending form the lower shroud wall 64, as well as a generally rectangular middle wing wall 74 extending tangentially from the generally circular upper and lower shroud wall 62, 64 between the upper and lower wing walls 70, 72. A generally cylindrical protective cage 50 extends concentrically from the upper shroud wall 62 to the lower shroud wall 64 to protect the internal mechanism from damage, such as damage from objects such as stones or other road debris being impelled by passing vehicles. The external shroud 60 is preferably formed from a tough weather-resistant material.

Figure 5:
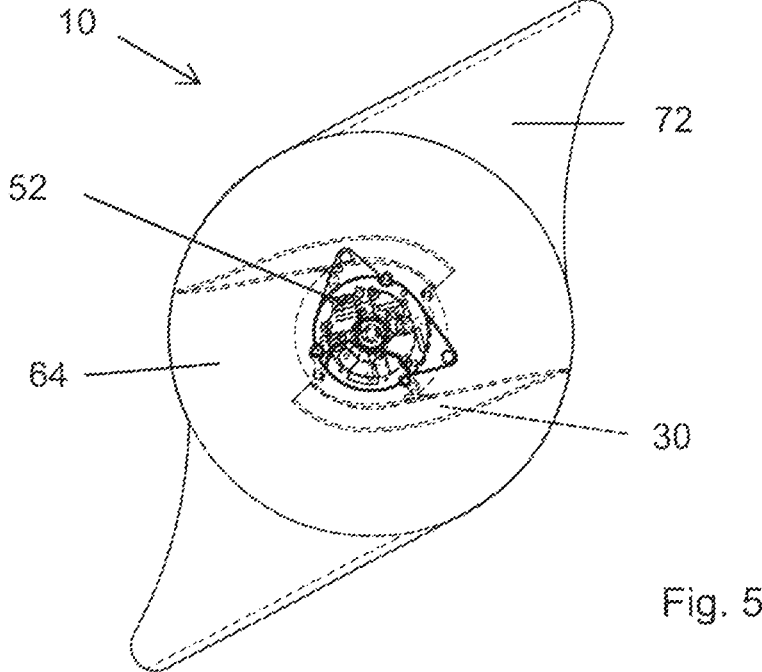
FIG. 5 is a bottom plan view of the vertical wind turbine of FIG. 1.
Figure 3:
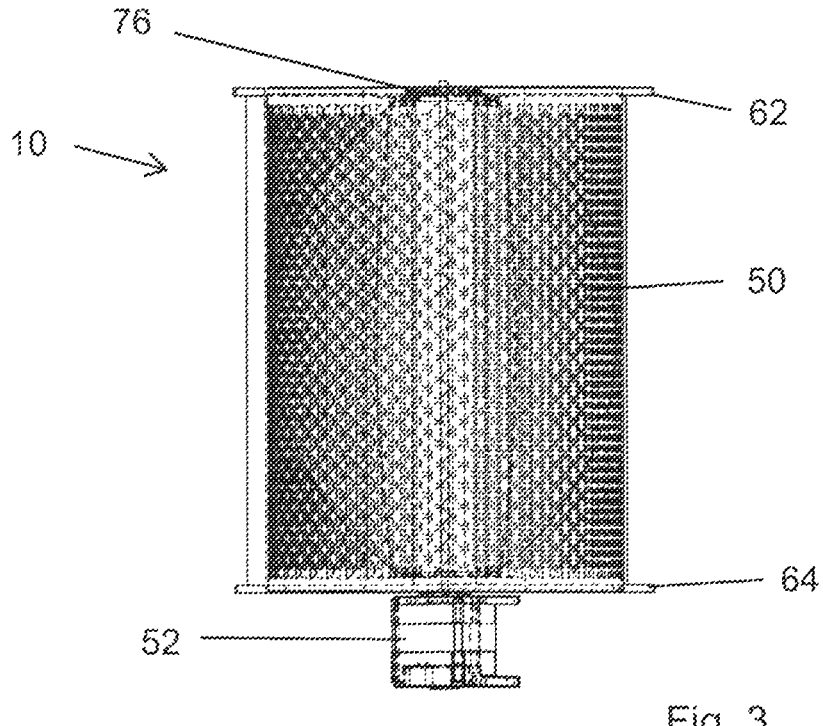
FIG. 3 is a left side elevational view of the vertical wind turbine of FIG. 1.
Figure 4:
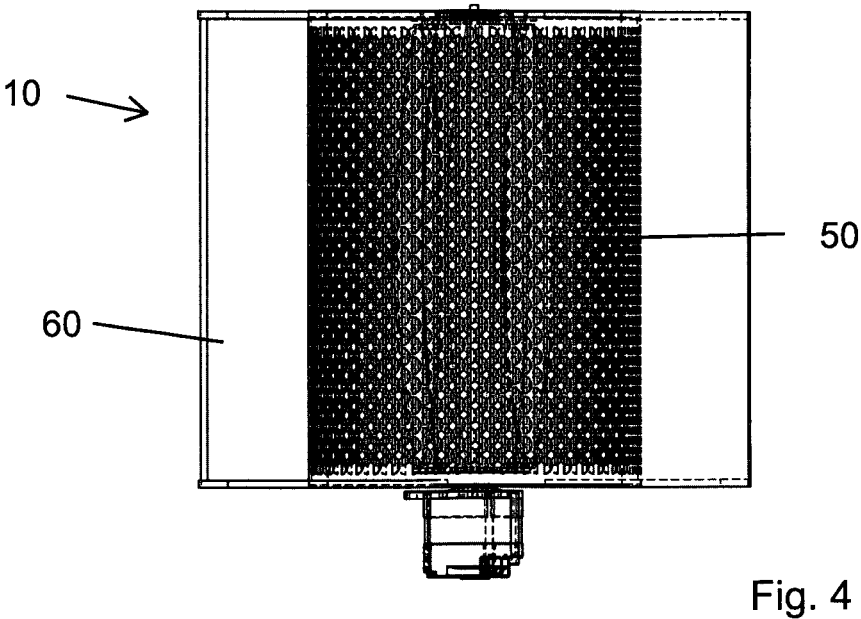
FIG. 4 is a front elevational view of the vertical wind turbine of FIG. 1.
Figures 11, 12, 13, 14:
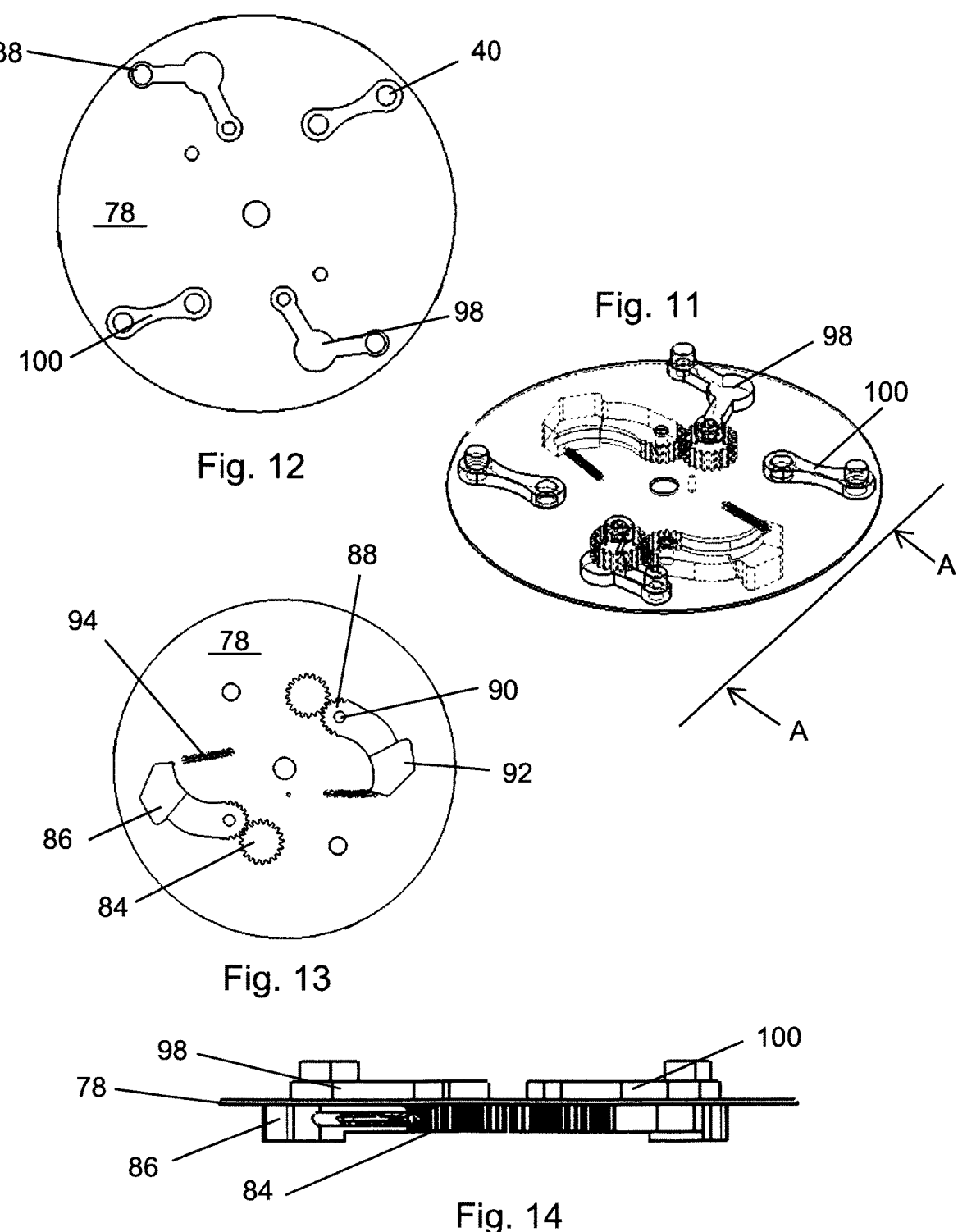
FIG. 11 is a perspective view of the balancing mechanism of FIG. 6.
FIG. 12 is a top plan view of the balancing mechanism of FIG. 6.
FIG. 13 is a bottom plan view of the balancing mechanism of FIG. 6.
FIG. 14 is a side elevational view of the balancing mechanism of FIG. 6 taken along the line A-A of FIG. 11.

As can be seen in FIG. 2, where the protective cage 50 has been omitted for the sake of clarity, a pair of fan blades 30 extend generally vertically from an upper mounting plate 76 (FIG. 4) and a lower mounting plate 78. While a pair of fan blades 30 are shown, the present invention can employ three or more fan blades, preferably symmetrically disposed about the central axis of the vertical wind turbine. The upper and lower mounting plates 76, 78 are secured to a central axle 20 coincident with the central axis 12 of the vertical wind turbine 10, such that rotational motion of the mounting plates 76, 78 causes a central axle 20 to rotate. The central axle 20 extends through the lower shroud wall 64 where it is coupled to an electromagnetic energy generation device 52 such as an alternating current or direct current generator. The fan blades 30 have fan blade bodies 32 preferably formed from a tough, rigid or semi-rigid material, and having the cross-sectional shape of an airfoil or wing (best seen in FIG. 5). The fan blades 30 are each mounted between the upper and lower mounting plates 76, 78, by first and second upper mounting posts 34, 36 and first and second lower mounting posts 38, 40 (FIGS. 11 and 12). The mounting posts 34, 36, 38, 40 are received by corresponding apertures formed in tabs formed at the top (tabs 35 and 37) and the bottom (tabs 39 and 41) of the fan blade bodies 32, and are preferably rotatable about the posts. The tabs at the bottom 39, 41 of each blade 30 connect the fan blade bodies 32 to a balancing mechanism 80.

The balancing mechanism serves to adjust the orientation of the fan blades 30 in response to changes in the rotational speed of the vertical wind turbine 10 such that when incident wind impels the vertical wind turbine to higher rotational speeds the angle of the attachment of the fan bladed is reduced so that the rotational speed of the vertical wind turbine is diminished, and vice versa.

The wind turbines 10 of the present invention are drag-type devices that include at least two or three "scoops" or blades 30. Due to their curvature, the blades 30 experience less drag when moving against the wind than driving with the wind, which permits them to extract more wind power.

The balancing mechanism 80 is a mechanical mechanism able to protect the turbine 10 from high wind speed due to frequent, high speed traffic or stormy weather. In high winds, the position of the blades 30 is changed while a high power output from the turbine 10 is maintained.

Rotatable weights or "flyweights" 86 are rotationally mounted under lower mounting plate 78 and biased by return springs 94 (FIG. 11) toward the center of the vertical wind turbine 10. While the wind turbine 10 is operating under typical conditions, the rotatable weight 86 will be in a normal position in which the turbine's blades 30 are open wide to maximize air flow to generate energy. However, when the wind speed increases substantially and the rotational speed of the vertical wind turbine 10 increases, such as when the wind speed increases to the point of endangering the physical integrity of the vertical wind turbine 10, the increased centrifugal force on the rotatable weights 86 forces the weights 86 to rotate outward against the return springs 94.

The rotational motion of the rotatable weights 86 is transmitted through a pinion gear 84 and thus through the lower mounting plate 78 to a first connecting rod or linkage 98 and thus to the lower end of the blade 30. This changes the position of the blades 30 to reduce the wind force on the vertical wind turbine 10.

The balancing mechanism 80 serves to adjust the orientation of the fan blades 30 in response to changes in the rotational speed of the vertical wind turbine 10 such that when incident wind impels the vertical wind turbine 10 to higher rotational speeds, the first connecting rods 98 draw the fan blades 30 closer together so that the rotational speed of the vertical wind turbine 10 is diminished, and vice versa. A balancing mechanism 80 is provided at both the top and the bottom of the vertical wind turbine.

Figure 6:
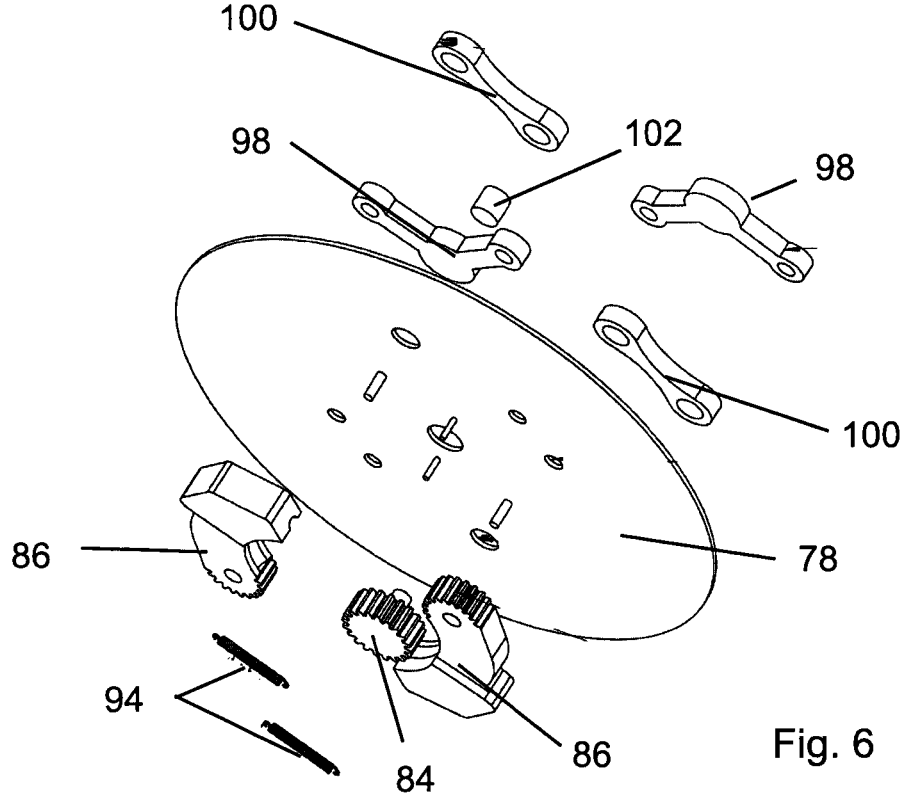
FIG. 6 is an exploded perspective view of the balancing mechanism of the vertical wind turbine of FIG. 1.
Figures 7, 8, 9, 10:
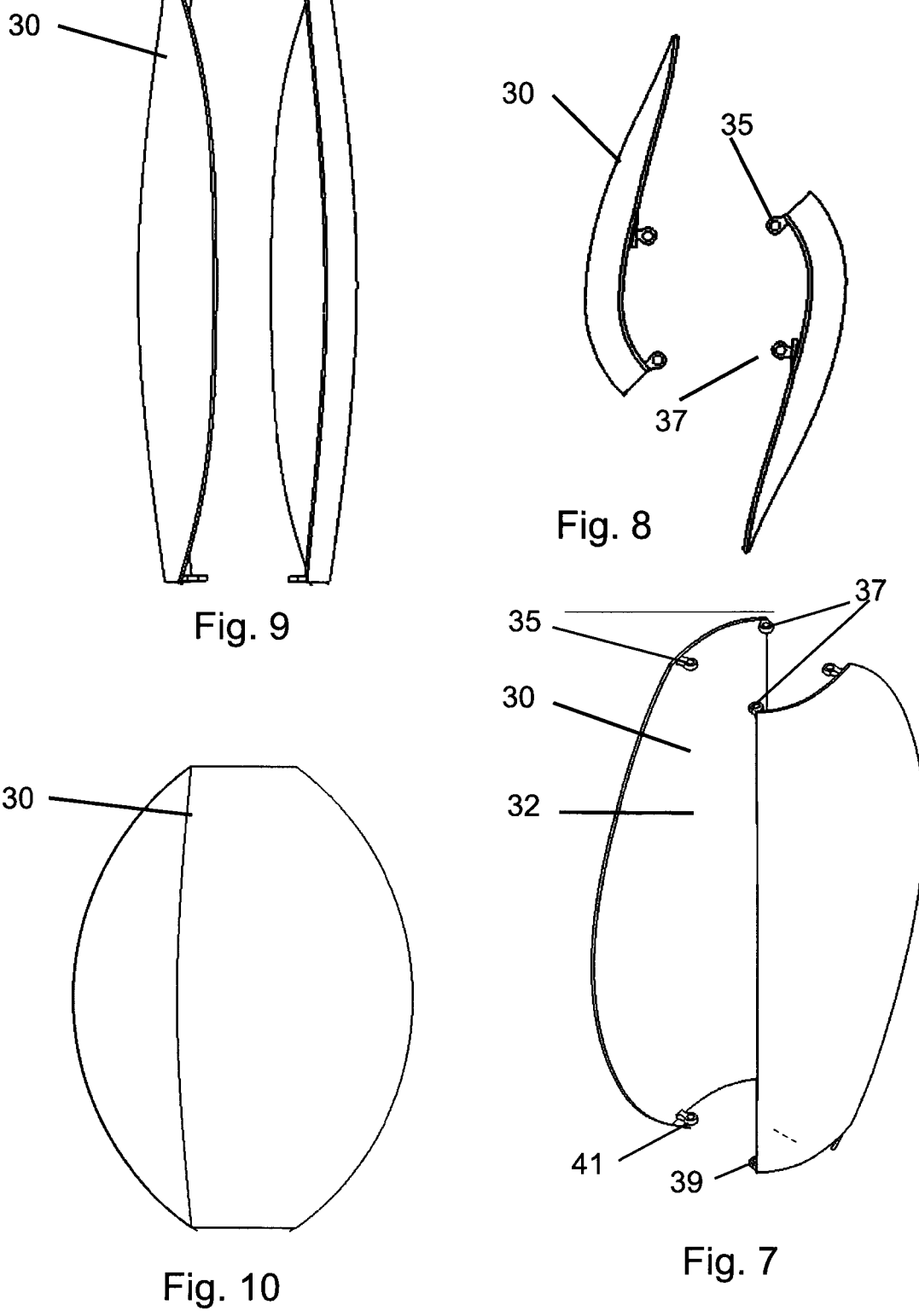
FIG. 7 is a fragmentary perspective view of the vertical wind turbine of FIG. 1 showing the fan blades.
FIG. 8 is a fragmentary top plan view of the vertical wind turbine of FIG. 1 showing the fan blades.
FIG. 9 is a fragmentary elevational view of the vertical wind turbine of FIG. 1 showing the fan blades from the ends thereof.
FIG. 10 is a fragmentary elevational view of the vertical wind turbine of FIG. 1 showing the fan blades from a side thereof.

The fan blade mounting posts 34, 36, 38, 40 are mounted in respective first apertures formed in a first end of first connecting rods 98 (FIG. 6). The first connecting rods 98 have second apertures at their second ends in which respective pins 102 are mounted. The pins 102 extend through apertures in the mounting plates 76, 78 and are received within pinion gears 84. The pinion gears 84, pins 102 and first connecting rods 98 form an integral unit which is rotatable in the aperture in the mounting plate 76, 78. Thus, the pinion gears 84 and first connecting rods 98 rotate together. The pinion gears 84 are mounted to engage a geared end of each of respective rotatable weights 86 (FIG. 13). The rotatable weights 86 are asymmetric having an arm with a partial generally cylindrical surface in which gear teeth are cut, with the aperture rotatably receiving a pin, the aperture being centered with respect to the generally cylindrical surface. The rotatable weights 86 are positioned such that the gear teeth engage the teeth of the respective pinion gear 84. Rotation of the rotatable weights 86 in one rotational direction (e.g. clockwise) causes rotation of the pinion gears 84 in the opposite rotational direction (counterclockwise). The second connecting rods 100 follow the motion of the first connecting rods 98 by virtue of their connection to the fan blades 30.

Figure 15:
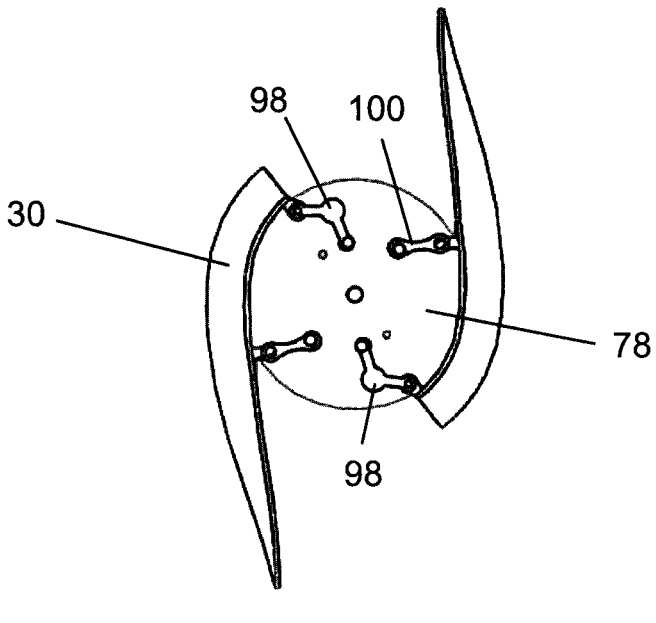
FIG. 15 is a fragmentary top plan view of the wind turbine of FIG. 1.
Figures 16, 17:
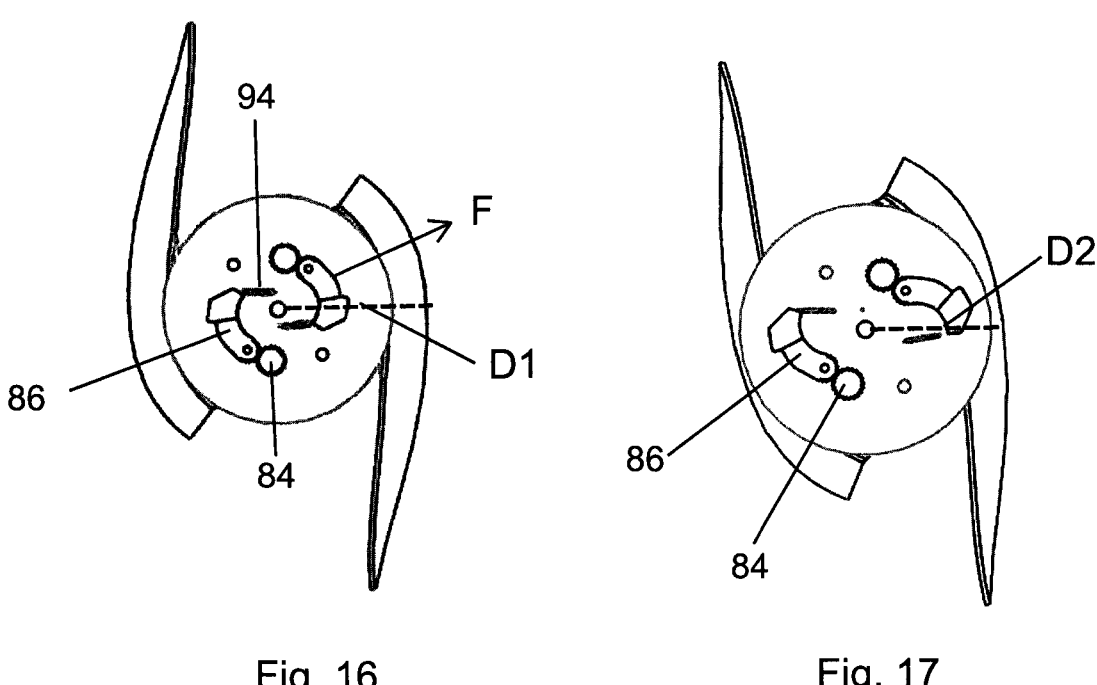
FIG. 16 is a first fragmentary bottom plan view of the wind turbine of FIG. 1.
FIG. 17 is a second fragmentary view of the wind turbine of FIG. 1.

As best seen by comparing FIG. 15 with FIG. 16, as the rotational speed of the vertical wind turbine 10 increases, centrifugal force causes the rotatable weights 86 to swing outward (arrow F), which in turn alters the positions of the first and second connecting rods 98, 100, and thus the orientation of the fan blades 30 with respect to the incident wind by drawing the forward portions of the fan blades 30 inward (i.e. thus "closing" the fan blades 30). Thus, the distance D1 from the central axle 20 to the nearest outside edge of the blade 30 in the fully open position (FIG. 16) decreases to a shorter distance D2 when the centrifugal force generated by a higher rotation speed has swung the rotatable weights 86 outward (FIG. 17). Thus, the vertical wind turbine 10 is "closed" when the maximum rotation of the rotatable weights has been achieved, in that the blades 30 have moved closer to one another. The rotation of the rotatable weights 86 is opposed by respective return springs 94, which are mounted to return the fan blades 30 to their initial orientation when the wind diminishes.

Figure 18:
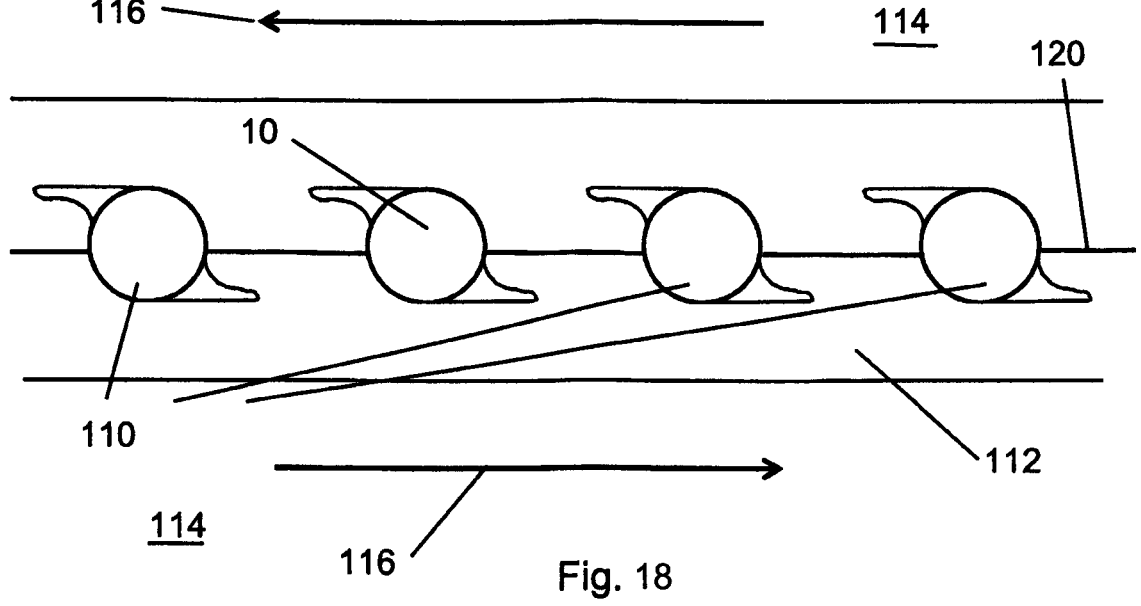
FIG. 18 is a schematic plan view of a plurality of vertical wind turbines of FIG. 1 installed within the median strip of a divided highway.

In one currently preferred embodiment, a plurality 110 of vertical wind turbines 10 are positioned in the median 112 of a divided highway having at least of pair of lanes 114 such that vehicular traffic travels in opposite directions 116 in either lane 114 (FIG. 18). The vertical wind turbines 110 are mounted such that the shroud wings 66, 68 "scoop" the moving air or vehicular wind created by the traffic on either side of the median. The electrical output from the electromagnetic energy generation devices 52 of the vertical wind turbines 110 is transmitted through a cable 120 in the median of the divided highway for consumption or storage in a suitable device.

Many changes can be made in the above-described invention without departing from the intent and scope thereof. For example, while the vertical wind turbine is shown as adapted for countries in which traffic must flow on the right-hand side of the road, a mirror image of the device would be suitable for countries in which the traffic must flow on the left-hand side of the road. It is, therefore, intended that the above description be read in the illustrative sense and not in the limiting sense. Substitutions and changes can be made while still being within the scope and intent of the invention and of the appended claims.

The invention claimed is:

1. A vertical wind turbine comprising:
a rotatable central axle having a central axis,
at least one pair of opposing vertical fan blades mounted for rotation with the central axle,
an electromagnetic electrical energy generation device mounted for rotation with the rotatable central axle,
an external shroud for directing wind toward the vertical fan blades, the external shroud comprising a first shroud wing and a second shroud wing, the first and second shroud wings each comprising a generally rectangular wing wall.

2. The vertical wind turbine according to claim 1 wherein the fan blades are positioned generally parallel to the central axle.

3. The vertical wind turbine according to claim 1 further comprising a balancing mechanism mounted for rotation with the rotatable central axle.

4. The vertical wind turbine according to claim 3 wherein the balancing mechanism is adapted to oppose rotational forces applied normal to the axis of the central axle.

5. The vertical wind turbine according to claim 1 further comprising a protective cage surrounding the fan blades.

6. The vertical wind turbine according to claim 1 wherein the external shroud is bilaterally symmetric.

7. The vertical wind turbine according to claim 1 wherein the shroud is adapted to receive wind incident in opposing directions on opposite sides of the shroud.

8. The vertical wind turbine according to claim 1 wherein the at least one pair of opposing fan blades comprise at least two symmetrically mounted fan blades.

9. A plurality of vertical wind turbines according to claim 1, the plurality of wind turbines being positioned along a line.

10. The plurality of vertical wind turbines according to claim 9 wherein the line extends along the median of a highway.

11. A process for energy generation, the process comprising:
a) providing at least one vertical wind turbine, the at least one vertical wind turbine comprising:
a rotatable central axle having a central axis,
at least one pair of opposing vertical fan blades mounted for rotation with the central axle,
an electromagnetic electrical energy generation device mounted for rotation with the rotatable central axle,
an external shroud for directing wind toward the fan blades, the external shroud comprising a first shroud wing and a second shroud wing, the first and second shroud wings each comprising a generally rectangular wing wall;

b) positioning the at least one vertical wind turbine along a median of a highway; and c) collecting electrical energy from the energy generation device of the at least one vertical wind turbine.

\* \* \* \* \*